United States Patent
Chen et al.

(10) Patent No.: US 11,000,712 B1
(45) Date of Patent: May 11, 2021

(54) CENTRALIZED HAND SANITIZER STATION

(71) Applicants: Robert C V Chen, Livermore, CA (US); Tiffany Y W Chen, Livermore, CA (US); Tina H Chen, Livermore, CA (US); Amelia N Chen, Orlinda, CA (US)

(72) Inventors: Robert C V Chen, Livermore, CA (US); Tiffany Y W Chen, Livermore, CA (US); Tina H Chen, Livermore, CA (US); Amelia N Chen, Orlinda, CA (US)

(*) Notice: Subject to any disclaimer, the term of this patent is extended or adjusted under 35 U.S.C. 154(b) by 0 days.

(21) Appl. No.: 16/909,178

(22) Filed: Jun. 23, 2020

(51) Int. Cl.
| | | |
|---|---|---|
| *G08B 21/00* | (2006.01) | |
| *A61Q 19/10* | (2006.01) | |
| *G06K 19/077* | (2006.01) | |
| *G06K 7/10* | (2006.01) | |
| *G08B 21/24* | (2006.01) | |

(52) U.S. Cl.
CPC ......... *A61Q 19/10* (2013.01); *G06K 7/10405* (2013.01); *G06K 7/10415* (2013.01); *G06K 19/07762* (2013.01); *G08B 21/245* (2013.01)

(58) Field of Classification Search
CPC ...... A61Q 19/10; A61Q 17/005; A61Q 17/02; A01N 55/00; G06K 7/10405; G06K 7/10415; G06K 19/07762; G08B 21/245; G08B 23/00
USPC ...................................................... 340/573.1
See application file for complete search history.

(56) References Cited

U.S. PATENT DOCUMENTS

| | | | | |
|---|---|---|---|---|
| 5,299,713 | A * | 4/1994 | Saitoh ................... | A47K 5/1217 222/255 |
| 6,502,721 | B2 * | 1/2003 | Redman ................. | A47K 5/12 222/94 |
| 10,149,576 | B1 * | 12/2018 | Hsu ....................... | A47K 5/1217 |
| 2009/0324444 | A1 * | 12/2009 | Stratmann ............. | E05F 15/75 422/28 |
| 2010/0265059 | A1 * | 10/2010 | Melker .................. | G16H 40/20 340/539.11 |
| 2011/0273298 | A1 * | 11/2011 | Snodgrass ............. | G08B 21/245 340/573.1 |
| 2017/0094974 | A1 * | 4/2017 | Smyth .................... | A61K 8/893 |
| 2019/0053495 | A1 * | 2/2019 | Smyth .................... | A61K 8/416 |

* cited by examiner

*Primary Examiner* — Mark S Rushing
(74) *Attorney, Agent, or Firm* — Lyman Moulton, Esq.; Moulton Patents, PLLC

(57) ABSTRACT

A central hand sanitizing system (CHSS) is disclosed. The system includes a plurality of sanitizer stations (PSS) each in a plumbing network, a central sanitizer store (CSS) in communication with the PSS in the plumbing network; and a hand sanitizer solution (HSS) dispersed from the CSS to the PSS via the plumbing network and having a composition targeted to determined pathogens. The HSS comprises an ethanol, a glycerol, a hydrogen peroxide, a distilled water and an antipathogen solution of predetermined concentrations. A pulse oximeter, a fever sensor and an electronic processor communicate a status of users of respective PSS and a status of respective PSS. A central hand sanitizing method additionally includes dispersing a hand sanitizer solution (HSS) from the CSS to the PSS via the plumbing network and dispersing informational metrics regarding the PSS, CSS and HSS and users thereof to remote receivers via the electronic network.

17 Claims, 2 Drawing Sheets

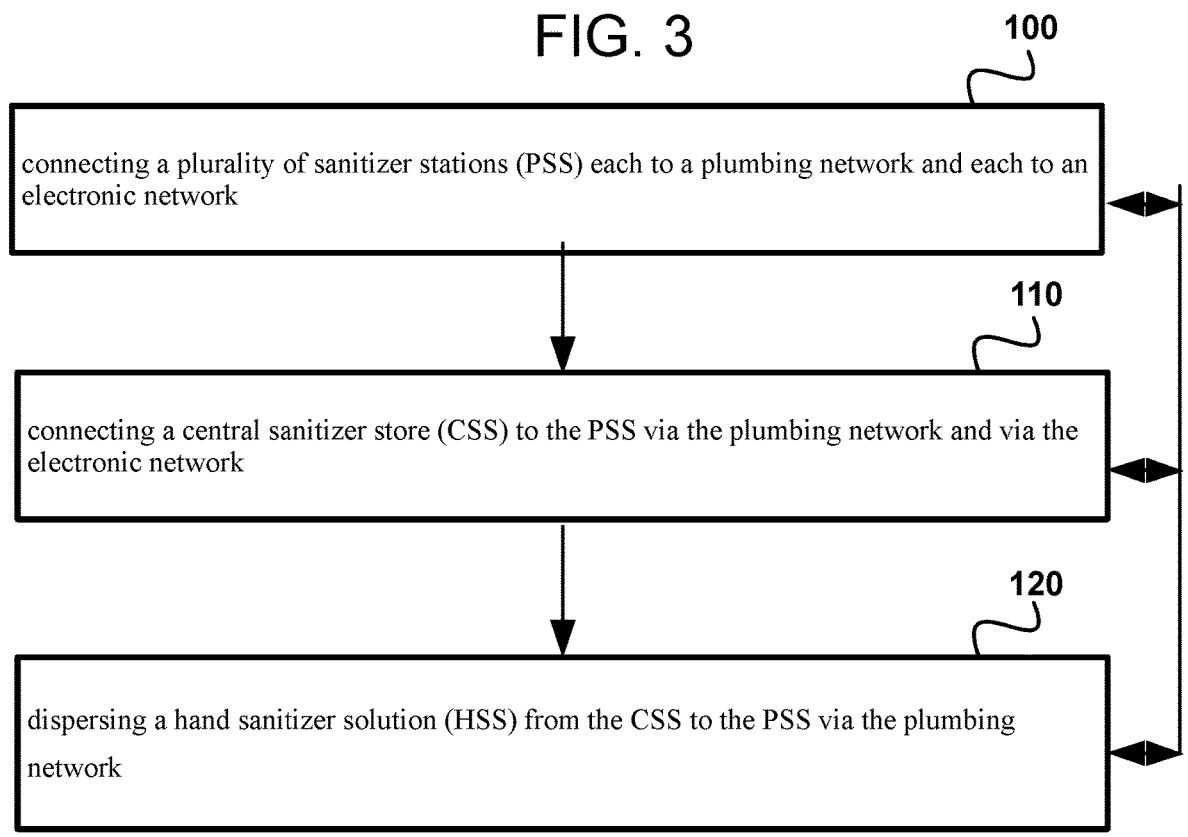
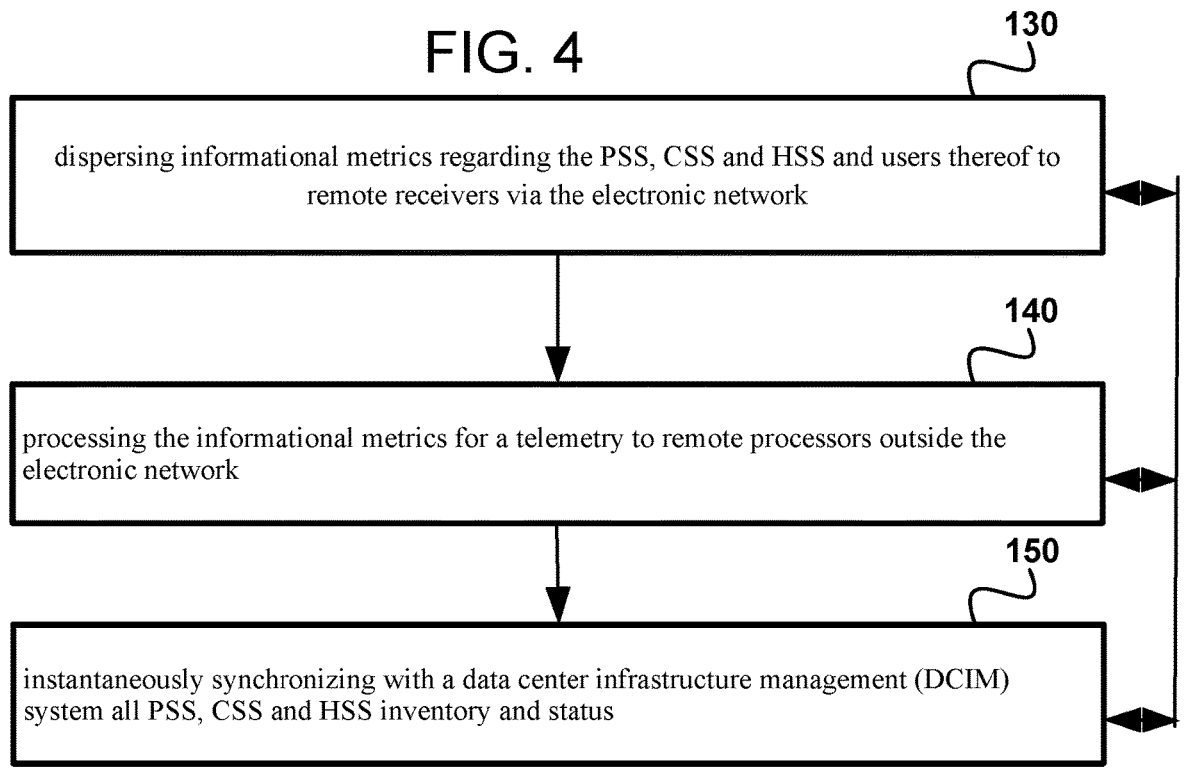

CENTRALIZED HAND SANITIZER STATION

BACKGROUND AND FIELD OF INVENTION

Hand sanitizer is a liquid, gel or foam generally used to decrease infectious agents on the hands. In most settings, hand washing with soap and water is generally preferred. Hand sanitizer is less effective at killing certain kinds of germs, such as corona virus and unlike soap and water, it cannot remove harmful chemicals. People may incorrectly wipe off hand sanitizer before it has dried, and some are less effective because their alcohol concentrations are too low.

In most healthcare settings alcohol-based hand sanitizers are preferable to hand washing with soap and water. Reasons include it being better tolerated and more effective. Hand washing with soap and water; however, should be carried out if contamination can be seen, or following the use of the toilet. The general use of non-alcohol-based hand sanitizers has no official recommendations to date.

Alcohol-based versions typically contain some combination of isopropyl alcohol, ethanol (ethyl alcohol), or n-propanol, with versions containing 60% to 95% alcohol the most effective. Care should be taken as they are flammable. Alcohol-based hand sanitizer works against a wide variety of microorganisms but not spores. Compounds such as glycerol may be added to prevent drying of the skin. Some versions contain fragrances; however, these are discouraged due to the risk of allergic reactions. Non-alcohol based versions typically contain benzalkonium chloride or triclosan; but are less effective than alcohol-based ones.

Alcohol has been used as an antiseptic at least as early as 1363 with evidence to support its use becoming available in the late 1800s. Alcohol-based hand sanitizer has been commonly used in Europe since at least the 1980s. The alcohol-based version is on the World Health Organization's List of Essential Medicines, the safest and most effective medicines needed in a health system. The wholesale cost in the developing world is about US$1.40-3.70 per liter bottle.

Thanks to hand sanitizers, all it takes is three easy steps to bid farewell to the germs on our hands. As a result, hand sanitizers have become the norm when speaking about hygiene. Billions of people around the globe regularly use them to keep their hands clean and safe. Mothers pass a sanitizer bottle to their kids after their play session and many others never leave a public washroom before using the available hand sanitizer.

However, germs are still spread and pandemics occur despite conventional hand sanitizers because viruses and bacteria evolve and become resistant to disinfection. Also, many germ and virus carriers resist using sanitizer stations or do not properly use them. There is therefore a need in the market for a smart hand sanitizer station with updated technology and an ability to change with evolving bacteria and viruses.

SUMMARY OF THE INVENTION

A central hand sanitizing system (CHSS) is disclosed. The system includes a plurality of sanitizer stations (PSS) each in a plumbing communication with a plumbing network, a central sanitizer store (CSS) in communication with the PSS in the plumbing network; and a hand sanitizer solution (HSS) dispersed from the CSS to the PSS via the plumbing network and having a composition targeted to determined pathogens. The CHSS also includes a pulse oximeter, a fever sensor and an electronic processor configured to communicate a status of users of respective PSS and a status of respective PSS.

A hand sanitizer method via the CHSS includes connecting a plurality of sanitizer stations (PSS) each to a plumbing network and each to an electronic network. The method also includes connecting a central sanitizer store (CSS) to the PSS via the plumbing network and via the electronic network. The method additionally includes dispersing a hand sanitizer solution (HSS) from the CSS to the PSS via the plumbing network. The method further includes dispersing informational metrics regarding the PSS, CSS and HSS and users thereof to remote receivers via the electronic network.

Other aspects and advantages of embodiments of the disclosure will become apparent from the following detailed description, taken in conjunction with the accompanying drawings, illustrated by way of example of the principles of the disclosure.

BRIEF DESCRIPTION OF THE DRAWINGS

FIG. 3 is a flow chart of method steps for the CHSS in accordance with an embodiment of the present disclosure.

FIG. 4 is a flow chart of further method steps in accordance with an embodiment of the present disclosure.

Figure 1:
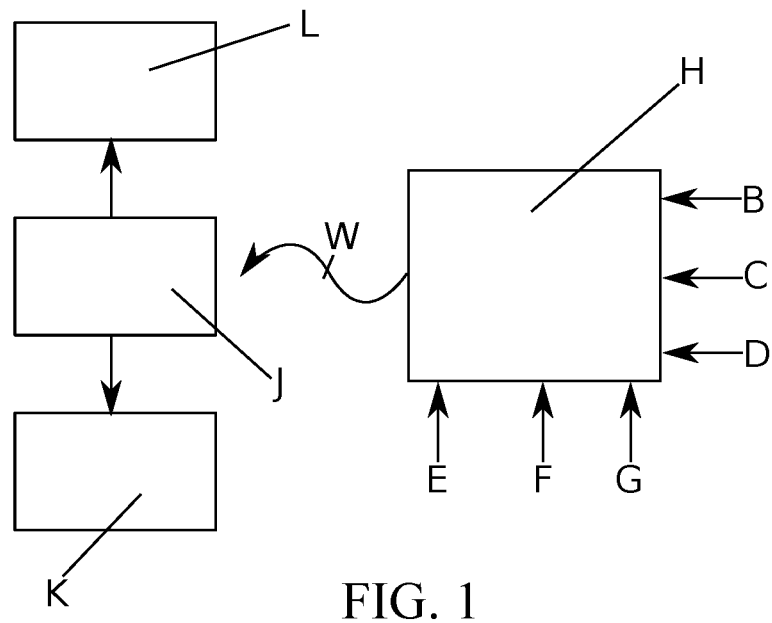
FIG. 1 is a functional component block diagram of a centralized hand sanitizer system (CHSS) in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the disclosure, the term "plumbing network" refers to an arrangement of interconnecting pipe to deliver a hand sanitizing fluid to several dispensing destinations. The pipe can be Pex polyethylene, copper, steel, plastic composites and even channels, conduits and any other similar to conventional indoor water plumbing networks. The terms 'parallel,' and 'series,' in reference to piping refers to a common fluid pressure across dispensers on at a time and a fluid pressure distributed across two or more dispensers at a time respectively. Similarly, the term 'electronic network,' refers throughout the disclosure to an arrangement of interconnecting electronic transceivers, both wired and wireless, configured to deliver information to and from system components for intelligence analysis and decision execution.

FIG. 1 is a functional component block diagram of a centralized hand sanitizer system (CHSS) in accordance with an embodiment of the present disclosure. The depiction includes a central processor H having a pulse oximeter input B, a temperature sensor input C, a hand sanitizer dispensor input D, a screen input E, a security camera input F and a face recognition input G and a wireless transceiver W into an internet gateway J in communication with a central monitor and reporting K and a telemetry processor L.

Figure 2:
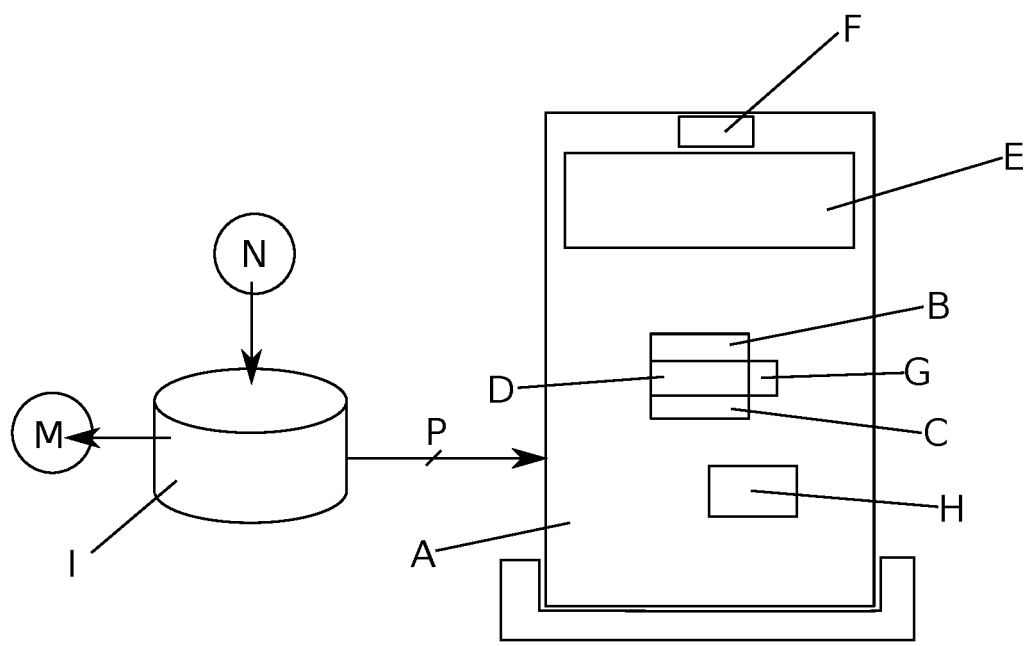
FIG. 2 is a physical component block diagram of the CHSS in accordance with an embodiment of the present disclosure.

FIG. 2 is a physical component block diagram of the CHSS in accordance with an embodiment of the present disclosure. The depiction includes the CHSS A, the pulse oximeter B, a temperature sensor C, the hand sanitizer dispensor D, the screen E, the security camera input F and the face recognition sensor/camera G. The central processor H and the wireless transceiver W in communication with the internet gateway J and the central monitor and reporting K and a telemetry processor L are not shown but are disposed proximal to or internal to the CHSS according to design and manufacturing considerations. The plumbing network P puts the CSS I in communication with the CHSS. The CSS I takes HSS input N and distributes the HSS to other CHSS via the plumbing network connected at M.

FIG. 3 is a flow chart of method steps for the CHSS in accordance with an embodiment of the present disclosure. A hand sanitizer method via the CHSS includes connecting 100 a plurality of sanitizer stations (PSS) each to a plumbing network and each to an electronic network. The method also includes connecting 110 a central sanitizer store (CSS) to the PSS via the plumbing network and via the electronic network. The method additionally includes dispersing 120 a hand sanitizer solution (HSS) from the CSS to the PSS via the plumbing network. The method further includes dispersing 130 informational metrics regarding the PSS, CSS and HSS and users thereof to remote receivers via the electronic network.

FIG. 4 is a flow chart of further method steps in accordance with an embodiment of the present disclosure. Embodiments of the method include a electronic network monitoring and managing the system including the PSS, CSS, HSS and the informational metrics. The embodiments also include processing 140 the informational metrics for a telemetry to remote processors outside the electronic network. The embodiments further include instantaneously synchronizing 150 with a data center infrastructure management (DCIM) system all PSS, CSS and HSS inventory and status.

A disclosed central hand sanitizer system (CHSS) includes a plurality of sanitizer stations (PSS) each in a plumbing communication with a plumbing network. The system also includes a central sanitizer store (CSS) in communication with the PSS in the plumbing network. The system additionally includes a hand sanitizer solution (HSS) dispersed from the CSS to the PSS via the plumbing network and having a composition targeted to determined pathogens. The plumbing network further comprises a network of pipe emanating from the CSS to each of the PSS in parallel and in series in some embodiments. The HSS is dispersed via a gravity pressure from a height of the CSS to the PSS and in some embodiments the HSS is dispersed via at least one pump in the plumbing network. An electronic processor is configured to communicate a status of users of respective PSS and an operational status of respective PSS.

Embodiments of the CHSS further include a touchless reflective pulse oximeter configured to measure an oxygen content of a hand disposed adjacent one of the PSS. The embodiments also include a face recognition circuit configured to identify pathogen carriers and to identify a mask, a goggle and gloves on a user. Embodiments further include an analytics processor in communication with the PSS and configured to process a data regarding users of the PSS.

Other embodiments include an RFID (radio frequency identification) chip disposed at each of the plurality of PSS. Such other embodiments also include a temperature sensor in each of the PSS, the temperature sensor configured to sense a fever in a user and an alarm for a predetermined low level HSS determination.

The HSS comprises an antiseptic, an antibiotic, an antiviral and a disinfectant as well as an ethanol, a glycerol, a hydrogen peroxide, a distilled water and an antipathogen solution of predetermined concentrations and predetermined hygiene and public safety needs.

Employing an RFID (radio frequency identification) system is one of the easiest methods to track Centralized Hand Sanitizer stations. By continuously pinging all stations, RFID can be used to update an asset control system in real time. Inventories will always be current, and staff will be promptly notified of any additions or removals. Not only will tracking be up-to-date, but it also will not be subject to the inaccuracies introduced by manual scanning and the errant keystrokes that may accompany the use of Excel or other spreadsheets.

With RFID systems, data can be accessible anywhere. The software can be programmed to instantaneously synchronize with a data center infrastructure management (DCIM) system or other management software. An RFID system can also be used to monitor the tags that exit and enter a facility. Appropriate personnel can receive notifications upon the removal of HSS from location.

Advantages of the CHSS are the ability to implement a shared formula for pathogen eradication in multiple stations of 2 or more for entrance and exits to grocery stores and common plumbed stations for all the entrance and egress of entire buildings and building complexes including hospitals and universities and business campuses, sports stadiums, airport lounges, train stations, hospitals, museums, government offices, restaurants and movie theaters, casinos, fitness centers, grocery stores, cruise ships and endless venues.

Central intelligence on use and users and station status enable data analytics and telemetry to combat pandemics and biological warfare. Furthermore, a central store of hand sanitizing solution will mean an end to stations without solution and an end to theft of solution and equipment.

Furthermore, the disclosed CHSS gives users feedback on their health and thus prevents or gives early warning of symptoms for other health problems such as low oxygen, mild infections with fever and gives health organizations information on tracking infected users to prevent future pandemics.

The central HSS and Feed Pump embodiments include a 95 Gallon Steel Receiver Tank 15 GPM pump with 1 motor HP and 40 PSI discharge pressure for 75 HP. Heavy gauge steel receiver tank, simplex or duplex construction, bronze fitted centrifugal pump(s), energy efficient 3450 RPM motors, automatic venting, ceramic pump seal (250° F.), heavy-duty make-up water valve and gauge glass venting.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A hand sanitizer system, comprising:
   a) a plurality of sanitizer stations (PSS) each in a plumbing communication with a plumbing network;
   b) a central sanitizer store (CSS) in communication with the plurality of sanitizer stations (PSS) in the plumbing network;
   c) a hand sanitizer solution (HSS) dispersed from the central sanitizer store (CSS) to the plurality of sanitizer stations PSS via the plumbing network and having a composition targeted to determined pathogens;
   d) an electronic processor configured to communicate a status of users of respective plurality of sanitizer stations (PSS) and an operational status of respective plurality of sanitizer stations (PSS);
   e) a touchless pulse oximeter configured to measure an oxygen content of a hand disposed adjacent one of the plurality of sanitizer stations (PSS); and
   f) a temperature sensor in each of the plurality of sanitizer stations (PSS), the temperature sensor configured to sense a fever in a user.

2. The system of claim 1, wherein the plumbing network further comprises a network of pipe emanating from the central sanitizer store (CSS) to each of the plurality of sanitizer stations (PSS) in parallel.

3. The system of claim 1, wherein the plumbing network further comprises a network of pipe emanating from the central sanitizer store (CSS) to each of the plurality of sanitizer stations (PSS) in series.

4. The system of claim 1, wherein the hand sanitizer solution (HSS) is dispersed via a gravity pressure from a height of the central sanitizer store (CSS) to the plurality of sanitizer stations (PSS).

5. The system of claim 1, wherein the hand sanitizer solution (HSS) is dispersed via at least one pump in the plumbing network.

6. The system of claim 1, further comprising a touch screen panel and speaker, both in a wireless communication with a central processor.

7. The system of claim 1, further comprising a face recognition circuit configured to identify a mask, a goggle and gloves on a user and on medical personnel.

8. The system of claim 1, further comprising an analytics processor in communication with the plurality of sanitizer stations (PSS) and configured to process a data regarding users of the plurality of sanitizer stations (PSS).

9. The system of claim 1, further comprising an RFID (radio frequency identification) chip disposed at each of the plurality of sanitizer stations (PSS).

10. The system of claim 1, further comprising an alarm for a predetermined low level of hand sanitizer solution (HSS) determination.

11. The system of claim 1, wherein the hand sanitizer solution (HSS) comprises an antiseptic, an antibiotic, an antiviral and a disinfectant.

12. The system of claim 1, wherein the hand sanitizer solution (HSS) comprises an ethanol, a glycerol, a hydrogen peroxide, a distilled water and an antipathogen solution of predetermined concentrations.

13. A hand sanitizer method, the method comprising:
   a) connecting a plurality of sanitizer stations (PSS) each to a plumbing network and each to an electronic network;
   b) connecting a central sanitizer store (CSS) to the plurality of sanitizer stations (PSS) via the plumbing network and via the electronic network;
   c) dispersing a hand sanitizer solution (HSS) from the central sanitizer store (CSS) to the plurality of sanitizer stations (PSS) via the plumbing network;
   d) dispersing informational metrics regarding the plurality of sanitizer stations (PSS), central sanitizer store (CSS) and hand sanitizer solution (HSS) and users thereof to remote receivers via the electronic network;
   e) communicating a status of users of respective plurality of sanitizer stations (PSS) and an operational status of respective plurality of sanitizer stations (PSS) via an electronic processor;
   f) measuring an oxygen content of a hand disposed adjacent one of the plurality of sanitizer stations (PSS) via a touchless pulse oximeter; and
   g) sensing a fever in a user via a temperature sensor in each of the plurality of sanitizer stations (PSS).

14. The method of claim 13, wherein the electronic network comprises a wireless monitoring and managing a system including the plurality of sanitizer stations (PSS), central sanitizer store (CSS), hand sanitizer solution (HSS) and the informational metrics.

15. The method of claim 13, further comprising processing the informational metrics for a telemetry to remote processors outside the electronic network.

16. The method of claim 13, further comprising instantaneously synchronizing with a data center infrastructure management (DCIM) system all plurality of sanitizer stations (PSS), central sanitizer store (CSS) and hand sanitizer solution (HSS) inventory and status.

17. A system for sanitizing hands, the system comprising:
   a) a plurality of sanitizer stations (PSS) each in a plumbing communication with a plumbing network;
   b) a central sanitizer store (CSS) in communication with the plurality of sanitizer stations (PSS) in the plumbing network; and
   c) a hand sanitizer solution (HSS) dispersed from the central sanitizer store (CSS) to the plurality of sanitizer stations (PSS) via the plumbing network and having a composition targeted to determined pathogens;
   d) a pulse oximeter;
   e) a fever sensor; and
   f) an electronic processor configured to communicate a status of users of respective plurality of sanitizer stations (PSS) and a status of respective plurality of sanitizer stations (PSS).

* * * * *